United States Patent
Sprengel

(10) Patent No.: US 10,394,258 B2
(45) Date of Patent: Aug. 27, 2019

(54) PRESSURE MAINTAINING VALVE FOR A REVERSIBLE CONNECTION TO AN AIR LINE

(71) Applicant: Dr. Ing. h.c. F. Porsche Aktiengesellschaft, Stuttgart (DE)

(72) Inventor: Thomas Sprengel, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 32 days.

(21) Appl. No.: 15/618,397

(22) Filed: Jun. 9, 2017

(65) Prior Publication Data

US 2017/0357276 A1    Dec. 14, 2017

(30) Foreign Application Priority Data

Jun. 14, 2016    (DE) .................. 10 2016 110 855

(51) Int. Cl.
  *F16K 1/46*    (2006.01)
  *F16K 17/24*   (2006.01)
  (Continued)

(52) U.S. Cl.
  CPC ............ *G05D 16/106* (2013.01); *F16K 1/46* (2013.01); *F16K 1/465* (2013.01); *F16K 17/24* (2013.01);
  (Continued)

(58) Field of Classification Search
  CPC ..... Y10T 137/87265; Y10T 137/87273; Y10T 137/87338; Y10T 137/7781;
  (Continued)

(56) References Cited

U.S. PATENT DOCUMENTS

| 2,471,237 | A | * | 5/1949 | Pasturczak | ............ | F16L 37/367 |
| | | | | | | 137/614.03 |
| 3,961,645 | A | * | 6/1976 | Kagan | ..................... | F16L 37/23 |
| | | | | | | 137/630.15 |

(Continued)

FOREIGN PATENT DOCUMENTS

| CH | 359937 A  | 1/1962 |
| CN | 1756917 A | 4/2006 |

(Continued)

OTHER PUBLICATIONS

German Search Report for German Application No. 10 2016 110 855.3, dated Mar. 1, 2017, including partial English translation, 8 pages.

(Continued)

*Primary Examiner* — Jessica Cahill
(74) *Attorney, Agent, or Firm* — RatnerPrestia

(57) ABSTRACT

A pressure-maintaining valve for a reversible connection to an air line, having a basic body with an inlet opening, an outlet opening for accommodating the air line, and a fluid chamber which connects the inlet opening to the outlet opening in a fluid-communicating manner. A piston which is mounted movably between a sealing position, an equalizing position and a release position is arranged in the inlet opening, and the piston has an annular groove with a piston sealing surface and a piston release surface. In the sealing position, a sealant is arranged in a sealing manner between the piston sealing surface and a basic body sealing surface. In the equalizing position an equalizing line arranged in the sealing piston bypasses the sealant in a fluid-communicating manner. In the release position, the piston release surface lifts off the sealant from the basic body sealing surface.

7 Claims, 3 Drawing Sheets

(51) Int. Cl.
*G05D 16/10* (2006.01)
*F16K 31/122* (2006.01)

(52) U.S. Cl.
CPC ...... *F16K 31/1221* (2013.01); *F16K 31/1226* (2013.01)

(58) Field of Classification Search
CPC . Y10T 137/86984; G05D 16/106; F16K 1/46; F16K 1/465; F16K 17/24; F16K 31/1221; F16K 31/1226
USPC ...................................................... 251/149.6
See application file for complete search history.

(56) References Cited

U.S. PATENT DOCUMENTS

| | | | | |
|---|---|---|---|---|
| 3,976,100 | A * | 8/1976 | Souslin | B64D 39/06 137/614.03 |
| 4,350,321 | A * | 9/1982 | Berg | F16L 37/23 137/614.03 |
| 4,452,267 | A | 6/1984 | Ott et al. | |
| 5,260,030 | A * | 11/1993 | DeVaughn | B01L 3/022 422/525 |
| 6,050,295 | A * | 4/2000 | Meisinger | F16K 15/063 137/541 |
| 6,325,100 | B1 * | 12/2001 | Bunschoten | B67D 1/0832 137/614.04 |
| 6,340,018 | B1 * | 1/2002 | Mattes | F02M 47/027 123/467 |
| 6,659,426 | B2 | 12/2003 | Schroeder et al. | |
| 8,056,581 | B2 * | 11/2011 | Danielson | F16L 37/23 137/614 |
| 9,121,522 | B2 * | 9/2015 | Harada | F16K 31/04 |
| 9,328,745 | B2 * | 5/2016 | Bartlok | F15B 1/04 |
| 2005/0161628 | A1 * | 7/2005 | Tiberghien | F16L 37/42 251/149.6 |
| 2014/0020772 | A1 | 1/2014 | Anderson | |
| 2015/0260139 | A1 * | 9/2015 | Rouillon | F02M 63/005 137/513.5 |

FOREIGN PATENT DOCUMENTS

| | | |
|---|---|---|
| CN | 201651462 U | 11/2010 |
| CN | 102269286 A | 12/2011 |
| CN | 102518862 A | 6/2012 |
| CN | 102563154 B | 4/2016 |
| DE | 10261890 A1 | 8/2003 |

OTHER PUBLICATIONS

Chinese Office Action for Chinese Application No. 201710436891.9, dated Jan. 1, 2019, with English Search Report, 3 pages.

* cited by examiner

PRESSURE MAINTAINING VALVE FOR A REVERSIBLE CONNECTION TO AN AIR LINE

CROSS-REFERENCE TO RELATED APPLICATION

This application claims priority to German Patent Application No. 102016110855.3, filed Jun. 14, 2016, the content of such application being incorporated by reference herein in its entirety.

FIELD OF THE INVENTION

The present invention relates to a pressure-maintaining valve for a reversible connection to an air line, and to a method for inserting an air line into a pressure-maintaining valve.

BACKGROUND OF THE INVENTION

It is known that pressure-maintaining valves are used if pressure is intended to be transmitted between two different lines. This is the case in particular whenever a separation of said two separate pressure lines has to be provided in a reversible manner. It is thus known that, at the end of a pressure line, such a pressure-maintaining valve maintains the pressure in said pressure line as long as an air line is not connected on the opposite side. If the air line is connected, which is customarily undertaken by inserting it into an outlet opening of the pressure-maintaining valve, the pressure-maintaining valve has to open in a corresponding manner and provide pressure equalization for the conveying of compressed air.

A disadvantage of the known solutions is that a relatively great amount of effort is necessary in order to insert an air line into the outlet opening of the pressure-maintaining valve. This great amount of effort results from the counterforce which is applied by the pressure present at the inlet opening of the pressure-maintaining valve. A valve body is thus customarily arranged within a known pressure-maintaining valve, said valve body pressing with a sealant against a sealing surface of a basic body of the pressure-maintaining valve. The corresponding counterforce is produced here from the product of the pressure at the inlet opening of the pressure-maintaining valve and the square of the area within the sealing surface of the sealant.

At high pressures, this may even lead to the counterforce being of such a magnitude that a corresponding insertion is no longer possible at all, and there is therefore a malfunction.

SUMMARY OF THE INVENTION

It would be desirable to at least partially eliminate the disadvantages described above. In particular, it would be desirable to improve the insertion of an air line into a pressure-maintaining valve in a cost-effective and simple manner.

Described herein is a pressure-maintaining valve serves for a reversible connection to an air line. For this purpose, the pressure-maintaining valve has a basic body with an inlet opening, an outlet opening for accommodating the air line, and a fluid chamber which connects the inlet opening to the outlet opening in a fluid-communicating manner. A piston which is mounted movably between a sealing position, an equalizing position and a release position is arranged in the inlet opening. The piston is provided with an annular groove with a piston sealing surface and a piston release surface. In the sealing position, a sealant lies in a sealing manner between the piston sealing surface and a basic body sealing surface of the basic body.

In the equalizing position, an equalizing line arranged in the sealing piston is arranged in such a manner that it bypasses the sealant in a fluid-communicating manner. In the release position, the piston release surface lifts off the sealant from the basic body sealing surface.

The pressure-maintaining valve is therefore again provided with a basic body, at the inlet opening of which there can be pressurization with the aid of a pressure line. In order to ensure that, when an air line is removed, the pressure does not escape out of the pressure-maintaining valve, a sealant is guided into the sealing position with the aid of the piston, preferably assisted by the prestress explained further on. In the sealing position of the piston, the sealant therefore lies in a sealing manner between the basic body sealing surface and the piston sealing surface, and therefore the outlet opening is sealed in this manner. The pressure is maintained on said inlet side of the inlet opening of the pressure-maintaining valve, and therefore an air line can be removed.

In contrast to this sealing position, the release position is the normal operating state of the pressure-maintaining valve. In the release position, the sealant is lifted off from the basic body sealing surface via a piston release surface. A corresponding opening cross section in the outlet opening is therefore released such that the pressure is not only equalized, but rather compressed air can also be transported via the inlet opening, the fluid chamber and the outlet opening into the air line.

The intermediate position, which is referred to here as the equalizing position, is now of crucial importance. In order to reach said equalizing position, an equalizing line is arranged within the piston. Said equalizing position is taken up during the transition from the sealing position into the release position. In order to explain the corresponding functionality and the advantages in more detail, this procedure is explained step by step below.

If a connection between a compressed air line and an air line is desired, said air line is introduced at the beginning into the outlet opening of the pressure-maintaining valve. In particular, one end of said air line is therefore directly or indirectly in contact with the piston. Said contact, which is configured in particular in a flat manner, results in a corresponding, in particular translatory movement of the piston also being carried out during the further pushing of the air line into the outlet opening. This movement of the piston, which movement is produced by the pushing-in of the air line, is undertaken from the sealing position in the direction of the release position. From a certain intermediate position, an equalizing line is then released. The release of the equalizing line results in bypassing of the sealant. This means, in other words, that, at this time or at this point of movement, the piston sealing surface has already left the sealant. In other words, by means of the movement, the piston sealing surface is lifted off from the sealant while the sealant continues to be pressed against the basic body sealing surface, in particular pressed by the counterpressure on the pressure side of the inlet opening. The seal therefore actively continues with its sealing function. The equalizing line has in particular one or more line inlets, as described further on, which then lie on the pressure side, i.e. on the inlet side of the sealant, in a position corresponding to the equalizing position. The positive pressure in the form of an airflow can therefore penetrate said equalizing line and, bypassing the sealant, by means of a corresponding line outlet, as is likewise explained in more detail later on, can enter the fluid chamber in the direction of the outlet opening. Said equalizing line therefore serves, with a relatively small cross section, to provide pressure equalization. It should be pointed out here that the cross sections of the equalizing line can be kept very small since it is not the conveying of the fluid which is involved here, but rather exclusively the desired pressure equalization. As soon as the pressure equalization has been undertaken by the equalizing line by fluid-communicating bypassing of the sealant, a counterpressure is no longer present. This lack of counterpressure becomes noticeable by the fact that the further movement of the air line, and therefore in association therewith also of the piston, in the direction of the release position is now undertaken exclusively counter to the resistance force of the friction for said movement.

The main force which has to be overcome in the case of a pressure-maintaining valve during the pushing-in of the air line serves for moving the piston from the sealing position into the equalizing position, i.e. so long as a pressure difference still exists between the inlet opening and the outlet opening. However, in this case, a significantly lower counterforce will be present than is the case in known pressure-maintaining valves. Owing to the fact that the piston is arranged within the inlet opening, the piston sealing surface is automatically also located within or substantially within the basic body sealing surface. In other words, the area enclosed by the piston sealing surface will therefore be automatically smaller than is the case for the corresponding area of the basic body sealing surface. Since, however, it is precisely this area which is incorporated in mathematically squared form in the calculation of the counterforce, this structural reduction in the area leads to a significant reduction in the corresponding counterforce even when there is an identical pressure on the inlet side of the inlet opening of the pressure-maintaining valve.

It can therefore be summarized that a two-stage opening is provided by the provision of an equalizing line. A pressure counterforce owing to the pressure difference is only present here for the first part of the movement from the sealing position into the equalizing position. However, the pressure counterforce for this step of the movement is significantly lower than in the case of known pressure-maintaining valves since a significant reduction in the effective area has been able to be obtained here.

In the second step, a substantially pressure-equalized system is present, and therefore only frictional forces and therefore a very low counterforce still have to be overcome.

It can be of advantage if, in the case of a pressure-maintaining valve, a spring device which acts upon the piston with a spring force in the direction of its sealing position is arranged on the basic body. Such a spring device is equipped in particular with a spring element and a driver. Such a driver can have, for example, a stop surface against which one end of the spring element is supported. The other end of the spring element can be supported against a corresponding stop surface of the basic body, preferably within the basic body. It is also conceivable that the driver which may also be referred to as the spring body, is formed as a single piece, integrally or monolithically with the piston. The application of a spring force as prestress for the piston leads to a defined sealing force also being able to be applied as the minimum sealing force independently of the pressure present on the inlet side of the inlet opening of the pressure-maintaining valve. The sealing functionality is significantly improved here for a minimum sealing functionality and is thereby more secure.

It can furthermore be of advantage if, in the case of a pressure-maintaining valve, the equalizing line has at least one line inlet in the annular groove. The equalizing line can basically be freely configured in terms of design. It is crucial that, on the basis of its configuration in terms of design, the equalizing line has a fluid-communicating bypassing of the sealant in the equalizing position. The equalizing line may therefore also be referred to as a type of bypass which acts in the equalizing position. One possibility in this respect is if a line inlet or else a plurality of line inlets are provided in the annular groove.

By means of the corresponding relative movement of the piston and of the sealant along the inner surface of the annular groove, said annular groove corresponds to the relative position between the sealant and piston. If the piston is therefore moved in its movement in the direction of the equalizing position, the sealant slides past the piston, or conversely the piston slides past the sealant. This means that the relative position of a line inlet with respect to the sealant likewise changes during this movement and the bypassed described can then be enabled in this way. A particularly simple and cost-effective manner of production is also conceivable here, for example in the form of radial bores.

It is likewise of advantage if, in the case of a pressure-maintaining valve, the equalizing line has at least one line outlet on a head surface of the piston. Particularly simple and cost-effective manufacturing is also conceivable here, for example with the aid of an axial bore. Owing to the fact that the equalizing line can thereby be formed substantially completely within the material of the piston, a particularly simple and space-saving arrangement of the entire system is possible. Of course, a combination with one or more line inlets in accordance with the previous paragraph is conceivable here within the scope of the present invention.

It is furthermore of advantage if, in the case of a pressure-maintaining valve, the annular groove has an axial length which is greater than or equal to twice the axial extent of the sealant. An entire movement section is necessary for the movement along the movement line from the sealing position via the equalizing position into the release position. The corresponding annular ring is at least partially responsible for said movement section. The axial length of the annular groove therefore predetermines the relative path which can be covered relatively between the sealant and the piston. The line inlet described further above is preferably arranged here centrally on the annular groove, and therefore the annular groove can be situated either on the pressure-free side of the sealant, on the pressurized side of the sealant or precisely on the sealant. Owing to the fact that, in this embodiment, the annular groove is configured to be substantially the same size as or even greater than twice the extent of the sealant, precisely these three positions described above are possible in order to be able to be assigned to the corresponding functionalities of the three positions of the piston.

Furthermore, it is of advantage if, in the case of a pressure-maintaining valve, the area enclosed by the piston sealing surface lies completely or substantially completely within the area enclosed by the basic body sealing surface. While a reduction in the area is sufficient in principle in order to be able to provide a correspondingly described reduction of the counterforce, a complete reduction of the area within the piston sealing surface will entail an increase in said effect. Accordingly, the piston sealing surface will preferably lie completely within the basic body sealing surface. It should be pointed out here that customarily in reality a linear contact with the sealant is not exclusively involved since customarily an elastic deformation is provided for producing the desired sealing force for the sealant.

It is furthermore of advantage if, in the case of a pressure-maintaining valve, the piston has a cylindrical or substantially cylindrical basic shape for a translatory movement, in particular along a straight line, between the sealing position, the equalizing position and the release position. This makes it possible to provide a particularly simple manner of production. For example, simple production is conceivable with the aid of rotating machining. The translatory movement, in particular in the form of a straight line, makes it possible to simplify the overall system in respect of its complexity even further.

It is furthermore of advantage if, in the case of a pressure-maintaining valve, the piston has at least one sliding surface on its outer side for a sliding mounting in the inlet opening. This leads to a particularly simple and cost-effective solution for realizing this movement capability. For the sliding mounting, this sliding surface can have a reduced coefficient of friction, for example with the aid of a special surface coating and special machining.

It is furthermore of advantage if, in the case of a pressure-maintaining valve, the outlet opening has a latching device for latching the air line in an inserted position which corresponds to the release position of the piston. At the end of the process which has already been described and which follows the pushing-in of the air line, the piston is in the release position and is also held there counter to a spring prestress which is in particular present. In order to ensure that the air line no longer leaves this position, securing can take place with the aid of the described latching device. This latching device is configured in a reversible manner, and therefore the air line can, of course, also be pulled off again, as a result of which the pressure-maintaining valve accordingly closes since the piston is then moved again, in particular prestressed by a spring force, into the sealing position.

Also described herein is a a method for inserting an air line into a pressure-maintaining valve, having the following steps:

introducing the air line into the outlet opening, moving the air line together with the piston in the direction of the release position, equalizing the pressure between the inlet opening and the outlet opening by means of the equalizing line of the piston, and moving the air line together with the piston into the release position.

Here, features and details which are described in connection with the pressure-maintaining valve also apply, of course, in connection with the method and vice versa in each case, and therefore reciprocal reference is or can always be made as regards the disclosure of the individual aspects of the invention.

BRIEF DESCRIPTION OF THE DRAWINGS

By means of a method, the same advantages are obtained as have been explained in detail with regard to a pressure-maintaining valve. Further advantages, features and details of the invention will become apparent from the description below, in which exemplary embodiments of the invention are described in detail with reference to the drawings. The features mentioned in the claims and in the description may be essential to the invention in each case individually by themselves or in any combination. In the drawings, schematically:

DETAILED DESCRIPTION OF THE INVENTION

An embodiment of a pressure-maintaining valve 10 according to the present invention, a method and the manner of operation therewith are described with reference to FIGS. 1 to 3.

Figure 1:
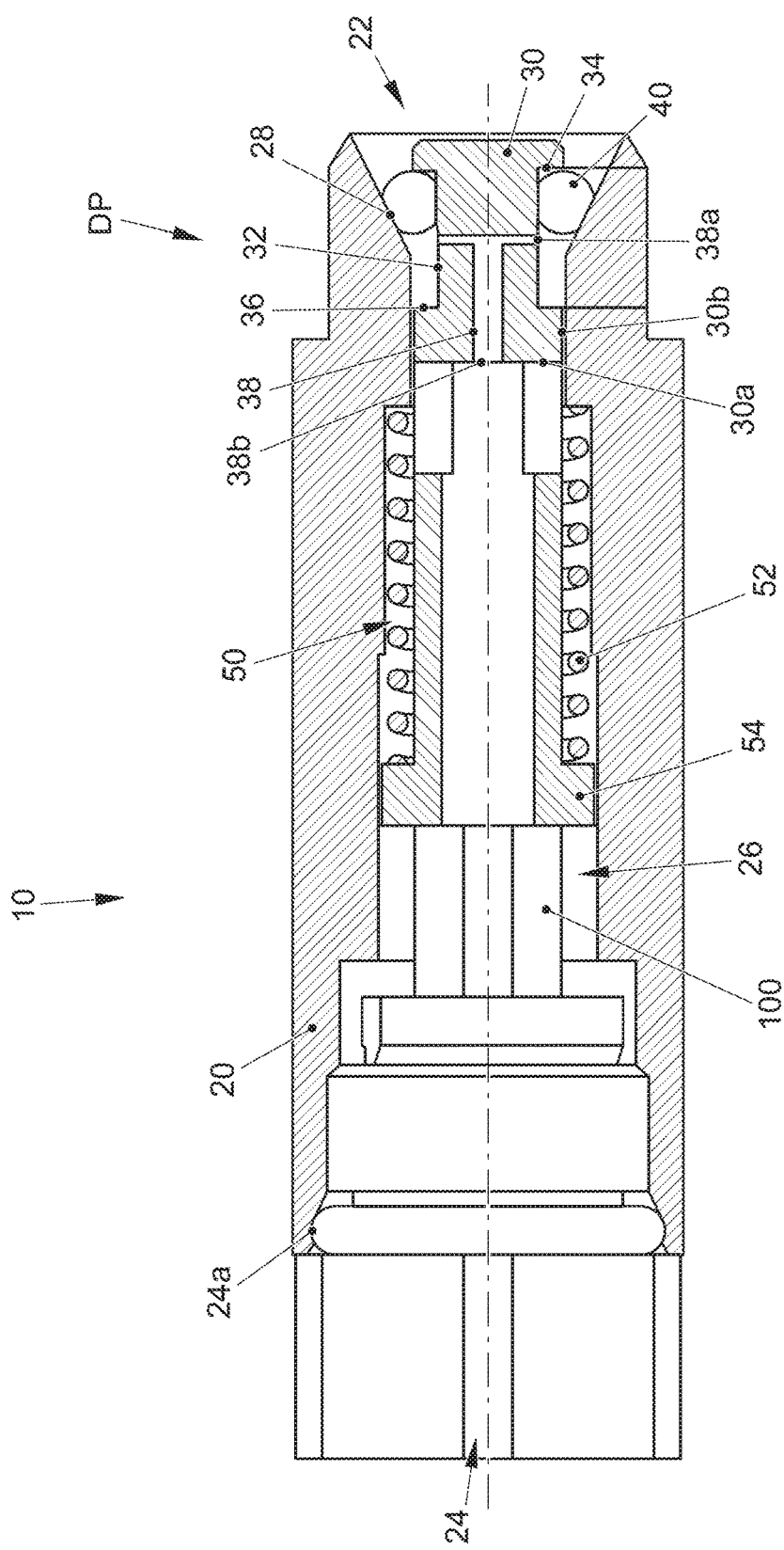
FIG. 1 shows an embodiment of a pressure-maintaining valve in a sealing position.

FIG. 1 illustrates the sealing position DP, i.e. with the air line 100 removed or not yet completely inserted. In this position, a positive pressure is present on the inlet side, i.e. at the inlet opening 22 of the basic body 20, in comparison to the outlet opening 24. In principle, a fluid-communicating connection is provided between the inlet opening 22 and the outlet opening 24 via the fluid chamber 26. In the current case according to FIG. 1, i.e. in the sealing position DP, said fluid-communicating connection is, however, sealed and therefore interrupted. The sealing is ensured by the sealant 40 which is clamped here between a basic body sealing surface 28 and a piston sealing surface 34 of a piston 30 and is therefore arranged in a sealing manner. The sealant 40 therefore seals said described pressure difference.

Figure 2:
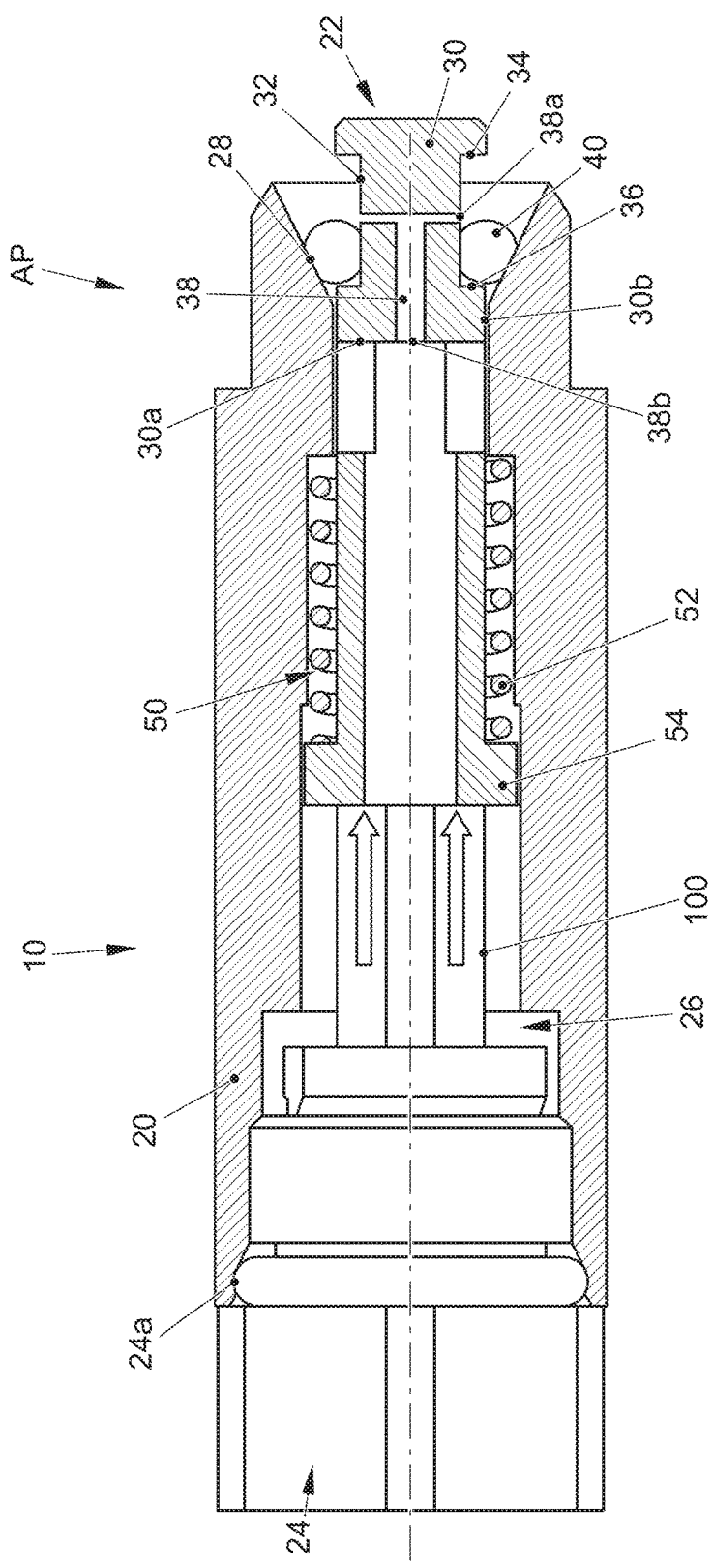
FIG. 2 shows the embodiment according to FIG. 1 in an equalizing position.
Figure 3:
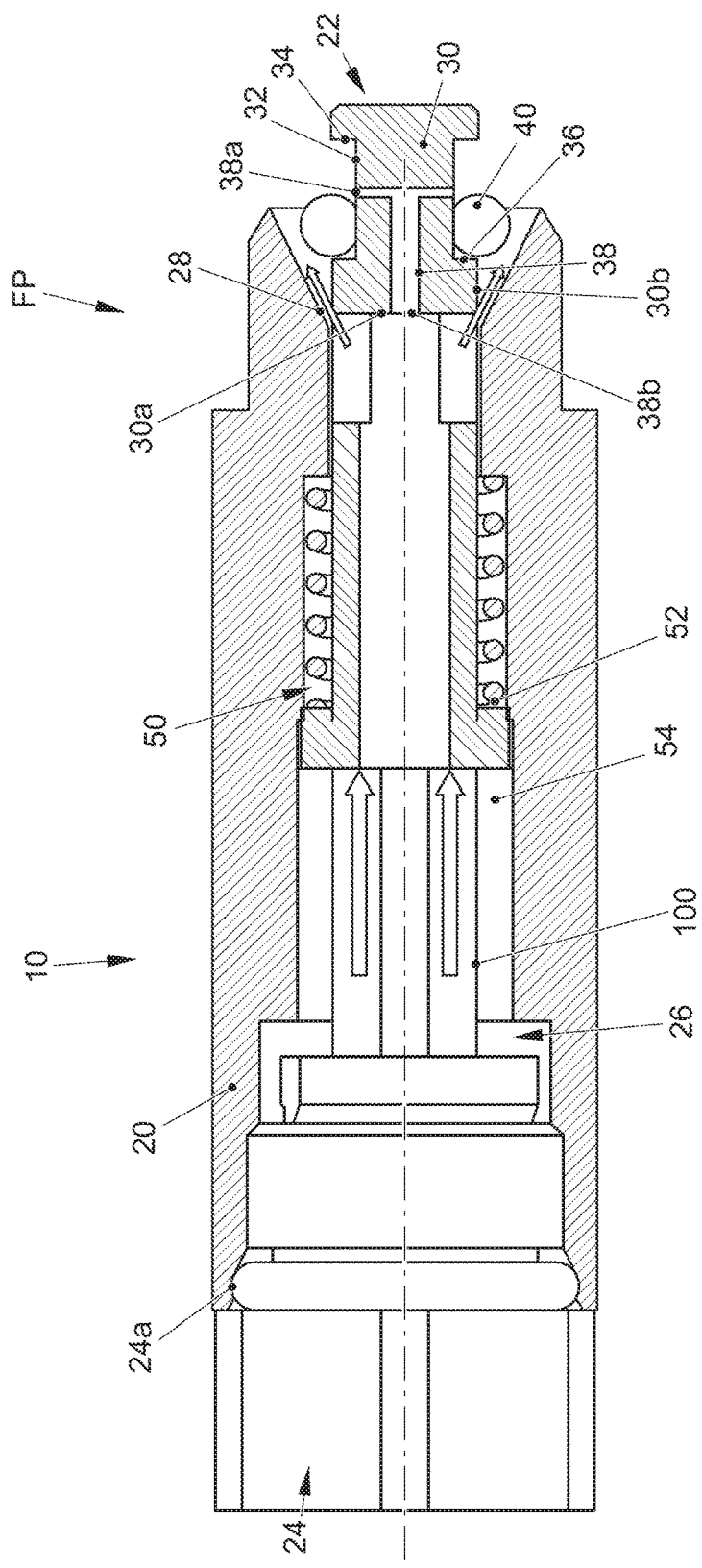
FIG. 3 shows the embodiment of FIGS. 1 and 2 in a release position.

If an air line 100 is then pushed in further, the air line 100 indirectly pushes the piston 30 in FIG. 1 via a driver 54 of a spring device 50 into a position to the right according to FIG. 2. The outlet opening 24 has a latching device 24*a* for latching the air line in an inserted position which corresponds to the release position of the piston. The spring force of the spring element 52, inter alia, is overcome here. However, it is crucial that the counterforce from the pressure difference between the inlet opening 22 and the outlet opening 24 also has to be overcome here. Said counterforce is calculated from the pressure difference and the correspondingly effective area which here is the inner area with respect to the piston sealing surface 34. Since said inner area with respect to the piston sealing surface 34 is smaller than the comparable area with respect to the basic body sealing surface 28, a smaller counterforce than would be the case in pressure-maintaining valves equipped as standard will accordingly also be present. As soon as said pressure counterforce has been able to be overcome to such an extent that the equalizing position AP according to FIG. 2 has been able to be reached, an equalizing line 38 bypasses the sealant 40 such that the pressure between the inlet opening 22 and outlet opening 24 can be equalized, as shown in FIG. 2. For said bypassing, i.e. the bypass, the equalizing line 38 is provided with line inlets 38 a in the annular groove 32 in which the sealant 40 is also arranged.

The corresponding line outlet 38*b* is provided on the opposite side, on the head surface 30*a* of the piston 30. From the time according to FIG. 2, a counterforce due to a pressure difference is no longer effective since said pressure difference has been equalized. For the further movement into the release position FP according to FIG. 3, only the spring force of the spring element 52 is then still overcome. In order then to release a sufficient flow cross section, from the equalizing position AP the sealant 40 is then in contact with the piston release surface 36 and is carried along by the piston 30 during the further movement into the position of the release position FP according to FIG. 3.

The above-described steps of inserting the air line 100 take place, of course, in the reverse direction when the air line 100 is pulled out, and therefore, at the end, the pressure-maintaining valve 10 is again in its closed and therefore sealing position DP.

The above explanation of the embodiments describes the present invention exclusively within the context of examples. Of course, individual features of the embodiment can be freely combined with one another, if technically expedient, without departing from the scope of the present invention.

What is claimed is:

1. A pressure-maintaining valve for a reversible connection to an air line, said valve comprising:
    a basic body with an inlet opening, an outlet opening for accommodating the air line, and a fluid chamber which connects the inlet opening to the outlet opening in a fluid-communicating manner,
    a piston arranged in the inlet opening and mounted movably between a sealing position, an equalizing position and a release position, the piston having an annular groove with a piston sealing surface and a piston release surface,
    wherein, in the sealing position, a sealant is arranged in a sealing manner between the piston sealing surface and a basic body sealing surface,
    in the equalizing position an equalizing line arranged in the piston bypasses the sealant in a fluid-communicating manner, wherein the equalizing line has at least one line inlet in the annular groove, and,
    in the release position, the piston release surface is lifted off the sealant from the basic body sealing surface.

2. The pressure-maintaining valve as claimed in claim 1, further comprising a spring device arranged on the basic body which acts upon the piston with a spring force in a direction of the sealing position.

3. The pressure-maintaining valve as claimed in claim 1, wherein the equalizing line has at least one line outlet on a head surface of the piston.

4. The pressure-maintaining valve as claimed in claim 1, wherein the annular groove has an axial length which is greater than or equal to twice an axial extent of the sealant.

5. The pressure-maintaining valve as claimed in claim 1, wherein the piston has a cylindrical or substantially cylindrical shape for a translatory movement along a straight line, between the sealing position, the equalizing position and the release position.

6. The pressure-maintaining valve as claimed in claim 1, wherein the piston has at least one sliding surface on an outer side for a sliding mounting in the inlet opening.

7. The pressure-maintaining valve as claimed in claim 1, wherein the outlet opening has a latching device for latching the air line in an inserted position which corresponds to the release position of the piston.

\* \* \* \* \*